United States Patent
Douglis et al.

(10) Patent No.: US 7,149,803 B2
(45) Date of Patent: Dec. 12, 2006

(54) METHOD FOR CONTENT DISTRIBUTION IN A NETWORK SUPPORTING A SECURITY PROTOCOL

(75) Inventors: Frederick Douglis, Basking Ridge, NJ (US); Michael Rabinovich, Gillette, NJ (US); Aviel D. Rubin, West Caldwell, NJ (US); Oliver Spatscheck, Randolph, NJ (US)

(73) Assignee: AT&T Corp., New York, NY (US)

( * ) Notice: Subject to any disclaimer, the term of this patent is extended or adjusted under 35 U.S.C. 154(b) by 680 days.

(21) Appl. No.: 09/877,977

(22) Filed: Jun. 8, 2001

(65) Prior Publication Data

US 2002/0007415 A1 Jan. 17, 2002

Related U.S. Application Data

(60) Provisional application No. 60/210,191, filed on Jun. 8, 2000.

(51) Int. Cl.
- G06F 15/16 (2006.01)
- G06F 3/00 (2006.01)
- H04L 12/28 (2006.01)
- H04L 9/00 (2006.01)

(52) U.S. Cl. ............ 709/228; 709/229; 709/230; 370/395.32; 713/201; 719/330

(58) Field of Classification Search ........ 709/229; 713/201; 370/395.32

See application file for complete search history.

(56) References Cited

U.S. PATENT DOCUMENTS

| 5,657,390 A | 8/1997 | Elgamal et al. |
| 6,108,703 A | 8/2000 | Leighton et al. |
| 6,141,758 A * | 10/2000 | Benantar et al. ........... 713/201 |
| 6,185,598 B1 | 2/2001 | Farber et al. |
| 6,523,067 B1 * | 2/2003 | Mi et al. .................. 709/229 |
| 6,735,206 B1 * | 5/2004 | Oki et al. ............. 370/395.32 |
| 6,842,906 B1 * | 1/2005 | Bowman-Amuah ........ 719/330 |

OTHER PUBLICATIONS

Schneier, Bruce, Applied Cryptography, John Wiley & Sons, Inc., Second edition, 514-515.*
R. Fielding et al., "Hypertext Transfer Protocol—HTTP/1.1," IETF RFC 2616, Network Working Group, 1999.
Freier et al., "The SSL Protocol Version 3.0," IETF Internet Draft, Netscape Communications, http://home.netscape.com/eng/ss13/index.html.
E. Rescorla et al., "The Secure HyperText Transfer Protocol," RFC 2660, IETF Network Working Group (Aug. 1990).
J. Postel, "User Datagram Protocol," RFC 768, IETF (Aug. 1980).
S. Shepler et al., "NFS Version 4 Protocol," RFC 3010, IETF Network Working Group (Dec. 2000).
V. Pai et al., "Locality Aware Request Distribution in Cluster Based Network Servers," In Proceedings of the Eighth International Conference on Architectural Support for Programming Languages and Operating Systems, ACM, San Jose, CA, Oct. 1998.

* cited by examiner

Primary Examiner—William Vaughn
Assistant Examiner—Philip C. Lee (57) ABSTRACT

The present invention is directed to a method of providing content distribution services while minimizing the processing time required for security protocols such as the Secure Sockets Layer.

4 Claims, 6 Drawing Sheets

METHOD FOR CONTENT DISTRIBUTION IN A NETWORK SUPPORTING A SECURITY PROTOCOL

CROSS REFERENCE TO RELATED APPLICATIONS

This application claims priority to U.S. Provisional Applications "CDN AND SSL ISSUES," Ser. No. 60/210,191, filed on Jun. 8, 2000, the contents of which are incorporated by reference herein.

BACKGROUND OF THE INVENTION

The present invention relates to content distribution in packet-switched networks.

Packet-switched networks, such as networks based on the TCP/IP protocol suite, can be utilized to distribute a rich array of digital content to a variety of different client applications. The most popular applications on the Internet today are browsing applications for searching the World Wide Web, e.g. Netscape Navigator or Microsoft Internet Explorer, which utilize the HyperText Transfer Protocol (HTTP) to retrieve documents written in the HyperText Markup Language (HTML) along with embedded content. See, e.g., R. Fielding et al., "Hypertext Transfer Protocol—HTTP/1.1," IETF RFC 2616, Network Working Group, 1999, which is incorporated by reference herein. Where there is a need to secure the communications between the HTTP server and the client, security protocols such as the Secure Sockets Layer (SSL) or Secure HTTP (S-HTTP) can be utilized to encrypt the content of the HTTP traffic. See, e.g., Freier et al., "The SSL Protocol Version 3.0," IETF Internet Draft, Netscape Communications, http://home.netscape.com/eng/ssl3/index.html; E. Rescorla et al., "The Secure HyperText Transfer Protocol," RFC 2660, IETF Network Working Group (August 1990), which are incorporated by reference herein. See also U.S. Pat. No. 5,657,390, "Secure Socket Layer Application Program Apparatus and Method," to Elgamal et al., which is incorporated by reference herein.

It is often advantageous when distributing digital content across a packet-switched network to divide the duty of answering content requests among a plurality of geographically dispersed servers. Companies such as Akamai Technologies, Digital Island, AT&T and Adero provide services—referred to in the art as "content distribution" services—utilizing architectures which dynamically redirect content requests to a cache advantageously situated closer to the client issuing the request. Such network architectures are referred to herein generically as "content distribution networks" or "CDNs" for short. These companies either co-locate caches within Internet Service Providers or deploy the cache servers within their own separate networks for their content provider customers. Despite the rapid proliferation of content distribution networks in the market today, the use of content distribution networks with existing security protocols such as SSL poses additional performance challenges—in particular compared to the already high amount of resources required to establish and maintain a secure session between a client and single server. The additional performance requirements stem from the fact that in a content distribution network a client might be redirected to multiple cache servers, each server required to establish a new secure communication session thereby degrading performance of the network.

SUMMARY OF THE INVENTION

The present invention is directed to a method of providing content distribution services while minimizing the processing time required for security protocols such as the Secure Sockets Layer. In accordance with an aspect of the invention, packets which are part of a secure communication connection negotiated with a particular cache server are directed to the same cache server in the content distribution network. In establishing the secure connection, the cache server can choose a session identifier that can be utilized by the content distribution network to direct subsequent packets to the proper cache server. For example, the cache servers can be labeled with a number that can be rapidly computed from the generated session identifier. Alternatively, the content distribution network can maintain a table associating client addresses with particular cache servers to ensure that client requests are served by the server that negotiated the secure communication connection. In accordance with another aspect of the invention, the content distribution network cache servers share state information regarding secure connections so that, even if a client request gets redirected to another cache server, that cache server will have access to the state information necessary to handle the secure communication connection. The client does not need to renegotiate with each different cache server in order to create state information required for the secure communication connection. The invention advantageously reduces the number of state negotiations that take place, thereby saving processing time and reducing the overall latency to the client.

These and other advantages of the invention will be apparent to those of ordinary skill in the art by reference to the following detailed description and the accompanying drawings.

DETAILED DESCRIPTION OF THE INVENTION

Figure 1:
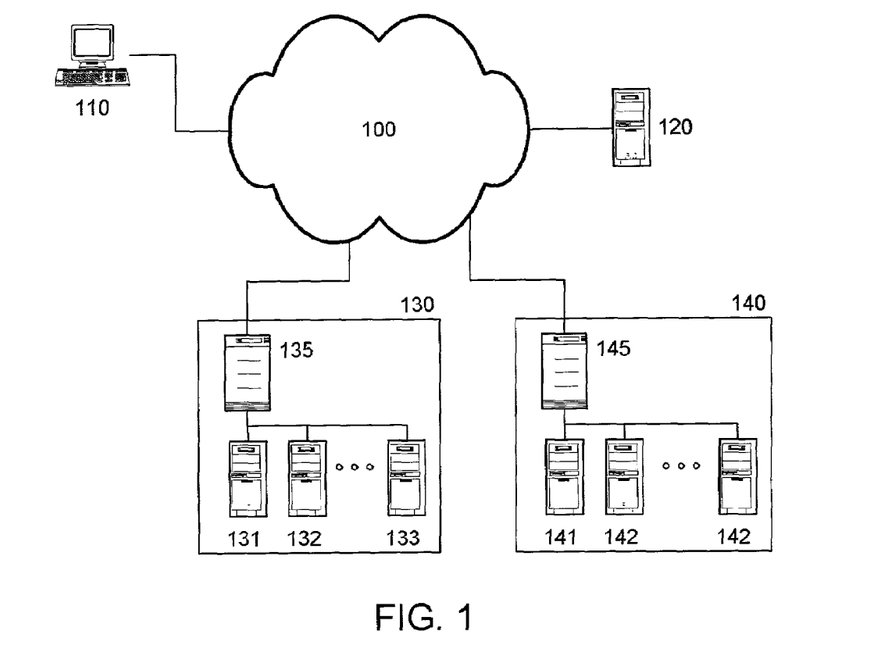
FIG. 1 is an illustrative content distribution architecture, suitable for practice of the present invention.

FIG. 1 is an illustrative content distribution architecture, suitable for practice of the present invention. A client 110 is connected to a packet-switched network 100, e.g. the Internet, which provides access to a plurality of content servers such as server 120. For example and without limitation, content server 120 can be a Web server that responds to HTTP requests by serving Web pages and other content to clients running Web browser applications. Each entity has access to a domain name service (DNS) server, which is not shown in FIG. 1. A content distribution provider enables a network of content distribution network nodes, illustratively 130, 140 in FIG. 1. Utilizing any of a variety of known techniques, content requests from client 110 may be redirected to a content distribution node, 130 or 140 in FIG. 1, preferably to a node that is "closer" to the client than the content server 120. See, e.g., U.S. Pat. No. 6,108,703, "Global Hosting System," to Leighton et al.; U.S. Pat. No. 6,185,598, "Optimized Network Resource Location," to Farber et al., which are incorporated by reference herein. The content distribution node then responds to the HTTP request utilizing a cached copy of the content that would have been served by server 120. Each content distribution node 130 can be a single cache server or, as shown in FIG. 1, can have a switch 135 providing access to a plurality of cache servers 131, 132, 133, etc. for further load balancing.

It is assumed that requests from the same client are directed to the same content distribution node, illustratively node 130 in FIG. 1. This can be accomplished, for example, by increasing the timeout value on domain name system cache entries where the domain name system is utilized to redirect requests in the content distribution network. It is also assumed that the client addresses packets to the same domain so that, from the client's perspective, it appears that it is communicating with the same server.

Where a secure connection is desired between the client 110 and the particular server it is dealing with, e.g. cache server 131 in FIG. 1, a standard security protocol such as SSL is utilized. The discussion herein is directed in particular to SSL, although the principles of the invention apply to any security protocol that requires the cache server to maintain state information. Using SSL, the client 110 and a server 131 first undertake a handshake protocol during which they agree on a protocol version, select cryptographic algorithms, optionally authenticate each other, and use public-key encryption techniques to generate shared secrets. The handshake protocol permits the client 110 and the server 131 to coordinate state information which includes:

(a) a session identifier ("SID") which is an arbitrary byte sequence chosen by the server to identify an active or resumable session state;

(b) a specification of the encryption algorithms utilized; and (c) a master symmetric key which is a secret shared by the client and server.

Figure 2:
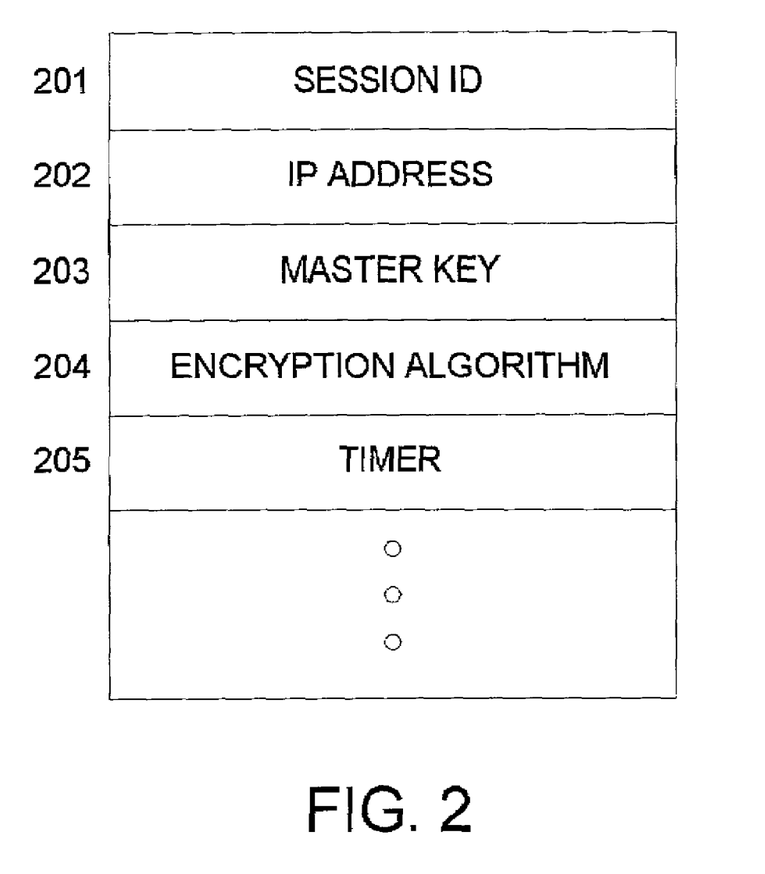
FIG. 2 is a conceptual representation of an entry in a secure session identification table.

When the client and the server resume a previous session, the client need only present the session identifier to the server which checks a session cache which stores state information from prior sessions. FIG. 2 is an illustrative conceptual representation of an entry in a secure session identification table that includes a field identifying a SID 201 and a variety of other fields including the secret master key 203. If the server finds a matching session identifier in the table that has not expired, the server and the client may resume the SSL connection without the need for the consuming task of exchanging a new master key using the relatively slow public-key algorithm.

Accordingly, where the cache server 131 in FIG. 1 has already generated state information with client 110, redirection of subsequent client requests to another cache server, e.g. cache servers 132 or 133, would require re-negotiation during the handshake protocol and the generation and exchange of a new master key and session identifier. It is thus advantageous to ensure that subsequent client requests be directed to the same cache server 131 to enable reuse of the secure connection—and avoid excess and costly SSL key negotiations. In accordance with an aspect of the invention, the server in the content distribution network negotiates a secure connection with the client and chooses a session identifier that advantageously can be used to direct the SSL traffic back to the proper server. Assume that the servers capable of dealing with SSL traffic are labeled 1 . . . n and, for efficiency purposes, the remaining content distribution servers are designated to handle only regular HTTP traffic. It is advantageous for a particular server/capable of handling SSL traffic to choose a SID such that i=f(SID) where f is some function that can be quickly computed, e.g. by the switch 135 at the CDN node 130. For example, and without limitation, one function for calculating the server label that could be utilized to associate server labels with session identifiers could be:

$$j = SID \text{ MOD } n+1$$

where n is the number of servers capable of handling SSL traffic. It should be noted that the particular server labels are arbitrary, as is the relationship between the server labels and the particular session identifiers chosen. Any particularly advantageous function can be utilized by the cache server 131 to choose a session identifier that the switch 135 will be capable of associating with the server 131.

The process of computing the SID can proceed as follows. The cache server 131 can compute the results of f(SID) for a given session identifier it generates from the process of negotiating the SSL connection. If the cache server 131 determines that f(SID) does not equal its server label, then it can re-generate another SID and recompute f(SID). Since n is relatively small, on average, the n/2 iterations that it takes to generate a proper session ID should be negligible, particularly if a fast pseudo-random generator is utilized for randomness. Alternatively, each cache server can precompute the SIDs that work for it and can be utilized wherever necessary.

Figure 3:
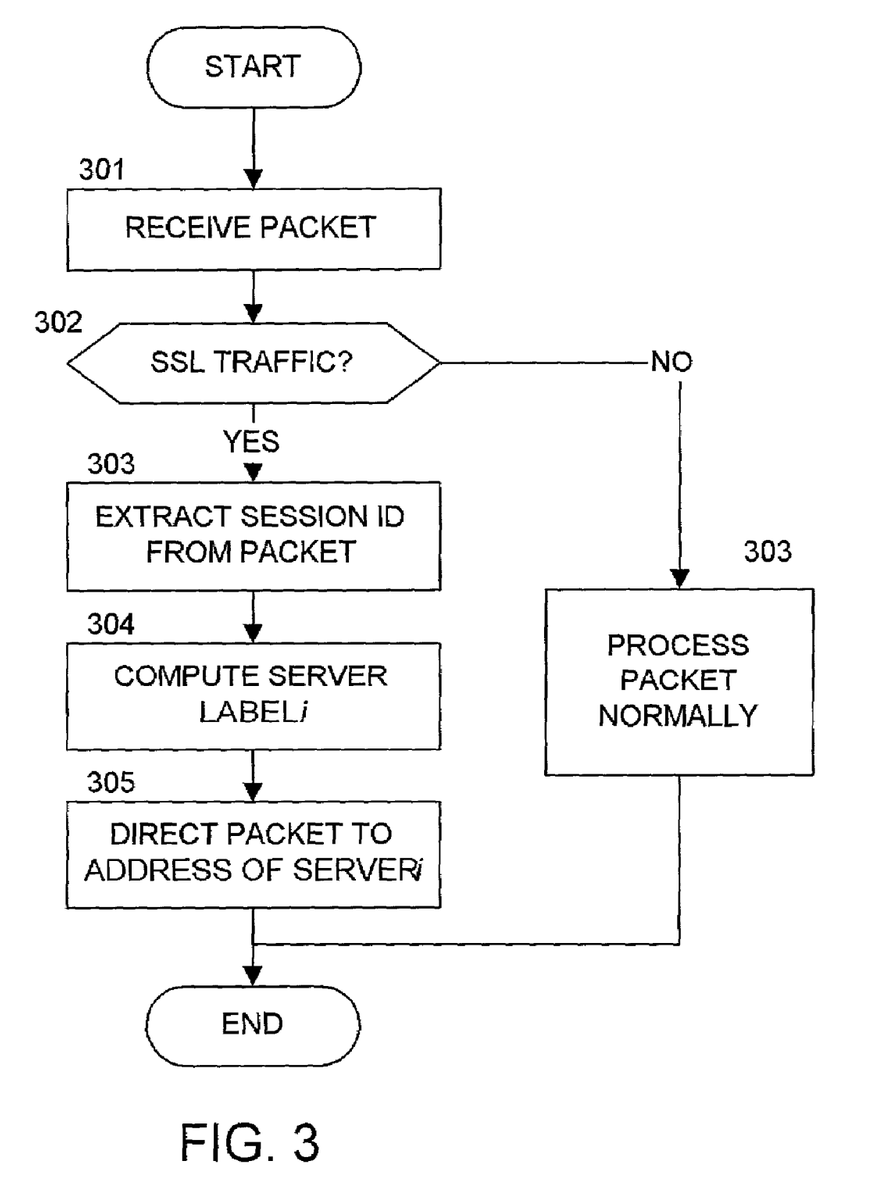
FIG. 3 is a flowchart of processing performed by a content distribution network switch, in accordance with one embodiment of the invention.

FIG. 3 sets forth the processing performed at the switch 135 in the content distribution node 130 in directing traffic to the cache servers. It is assumed that the switch is a content-aware switch capable of interpreting the HTTP or other application-layer protocol request. At step 301, the content distribution switch 135 receives a packet or packets to be forwarded to one of the cache servers 131 . . . 133 in the content distribution node 130. At step 302, the switch 135 interprets the request encapsulated in the packet(s) and determines whether it is an SSL message. If it is not, at step 303, the switch 135 processes the request normally and forwards it in accordance with whatever load-balancing functionality is provided. If it is an SSL message, the switch 135 extracts the session identifier from the packet at step 303. At step 304, the switch 135 then uses f(SID) to compute the server label i, e.g. i=SID MOD n+1. Then, at step 305, the switch 135 sends the packet(s) to the address of server/ which presumably maintains the SSL session state from the previous secure connection. The server twill then be able to serve the client request and resume the secure connection without recomputation of state.

Figure 4:
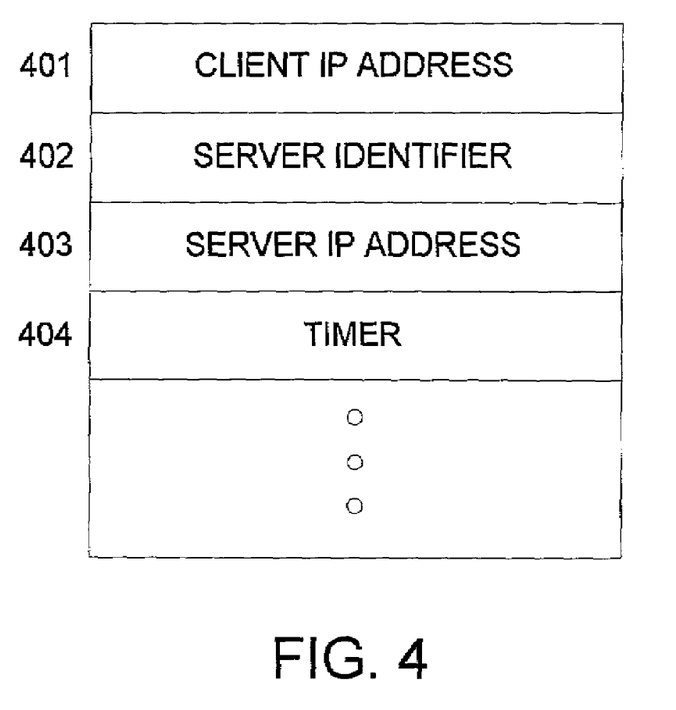
FIG. 4 is a conceptual representation of an entry in a table maintaining associations between client addresses and cache servers in a content distribution network.
Figure 5:
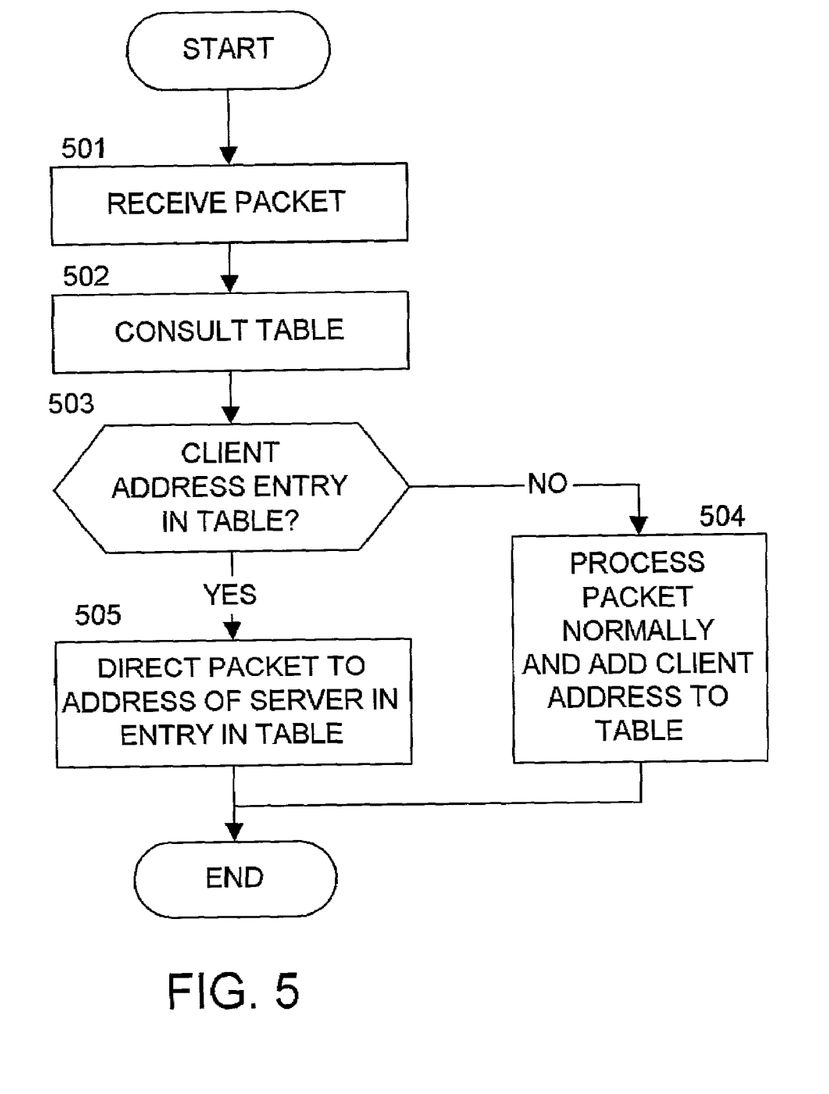
FIG. 5 is a flowchart of processing performed by a content distribution network switch, in accordance with a second embodiment of the invention.

Alternatively, it is also possible to ensure that subsequent client requests get redirected back to the same cache server by using what the inventors refer to as "sticky" network addresses. The content distribution network switch 135 can maintain a table of client addresses and store which cache server 131 . . . 133 was last assigned to communicate with that client. FIG. 4 is an illustrative conceptual representation of an entry in such a table that includes a field for the client network address 401, one or more fields for identifying the cache server to the switch, and a timer field 404 to permit the entries to expire after some specified period of time. Whenever traffic arrives from the client 110 that is identified by network address in the table, the switch 135 can direct that traffic to the same server that handled the traffic previously. This approach advantageously does not require that the switch 135 be capable of interpreting the request. Thus, the switch 135 without limitation can be what is referred to in the art as a "layer-four" switch that is capable of reading and interpreting network layer protocol headers in the packet, e.g. the IP headers of a datagram. FIG. 5 sets forth the processing performed by the switch 135 in the content distribution node 130 in directing traffic to the cache servers, in accordance with this embodiment of the invention. At step 501, the content distribution switch 135 receives a packet or packets to be forwarded to one of the cache servers 131 . . . 133 in the content distribution node 130. At step 502, the switch 135 looks at the packet header, reads the source network address, and consults the above-mentioned table. At step 503, the switch 135 searches the table for an entry matching the client's network address. If an entry is not found, the switch 135, at step S04, processes the packet normally and adds an entry to the table with the client's network address and the address of the cache server to which the switch 135 forwarded the packet. If an entry is found in the table, the switch 135, at step 505, directs the packet to the address of the server indicated in the entry in the table. Thus, subsequent packets received from the client related to a particular secure connection, for a period of time up until the entry in the table expires, should be directed back to the same server that maintains the state information for the SSL connection.

It should be noted that this second embodiment has various disadvantages in comparison to the first embodiment. One problem with this approach is that many clients use different IP addresses within a session. Another problem is that a single cache server might have to deal with all clients connecting through a forward proxy and, therefore, effectively prevent the switch from load balancing between the caches.

An alternative to the idea of using "sticky" network addresses is to have the switch 135 apply a hash function that maps network IP addresses to servers 131 . . . 133. Where the function is deterministic, the same client address will advantageously always map to the same server. Accordingly, subsequent packets received from the client related to a particular secure connection should be directed back to the same server that maintains the state information for the SSL connection. This would remove the need to maintain a table of client addresses as described in the above embodiment. A deterministic hash may have problems, for example, when a server fails or comes on-line. It then may be advantageous to use alternative protocols such as modifying the hash buckets to do what is referred to in the art as "consistent" hashing.

Figure 6:
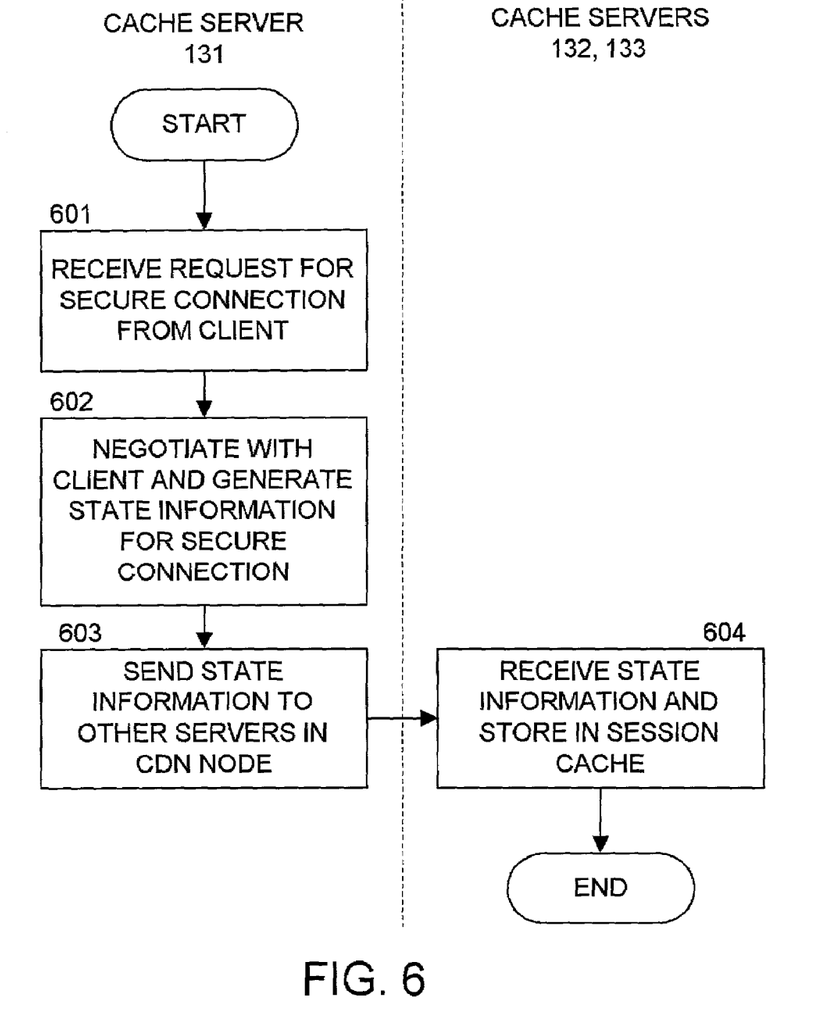
FIG. 6 is a flowchart of processing performed by a plurality of content distribution network cache servers, in accordance with a third embodiment of the invention.

There is an alternative to directing SSL traffic to the same cache server in the content distribution network. In accordance with another aspect of the invention, the cache servers 131 . . . 133 at the content distribution node 130 can share state information so that the switch 135 can continue forwarding client requests to any of the cache servers sharing state. As long as each cache server 131 . . . 133 has access to the state identification table information set forth in FIG. 2, each cache server 131 . . . 133 can resume the secure session without the need for renegotiation of the session. FIG. 6 sets forth the processing performed by the cache servers 131 . . . 133 in sharing SSL state information. At step 601, cache server 131 receives a request from the client 110 for a secure connection, thereby initiating the SSL handshake protocol. At step 602, the cache server 131, in negotiating with client 110, generates and stores state information for the secure connection, as further described above. At step 603, the cache server 131 sends a copy of the state information to the other cache servers 132, 133 in the content distribution node 130. The cache server 131 advantageously can utilize a lightweight protocol such as the User Datagram Protocol to transfer the information. See J. Postel, "User Datagram Protocol," RFC 768, IETF (August 1980), which is incorporated by reference herein. At step 604, the cache servers 132, 133 receive the state information and store the information in their respective session caches. Accordingly, when a future request from the same client arrives at any of the cache servers 131 . . . 133, the receiving cache server will have access to the state information for the SSL connection already in its session cache.

Alternatively, the cache servers 131 . . . 133 can utilize a distributed file system protocol such as NFS (Network File System) to share the state information. See, e.g., S. Shepler et al., "NFS Version 4 Protocol," RFC 3010, IETF Network Working Group (December 2000), which is incorporated by reference herein. However such an embodiment would possibly suffer from efficiency problems. Another alternative is to have the cache servers 131 . . . 133 utilize a distributed shared memory system to share the state information. See, e.g., K. Li and P. Hudak, "Memory coherence in shared memory systems," ACM Transactions on Computer Systems, 7(4), November 1989.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the detailed description has been presented in the context of a particular content distribution architecture and the SSL protocol; however, the principles of the present invention could be extended to other content distribution architectures and to other security protocols. Such an extension could be readily implemented by one of ordinary skill in the art given the above disclosure.

What is claimed is:

1. A method of operating a content distribution network switch in a content distribution network comprising the steps of:

receiving a packet from a client associated with a secure communication connection;

extracting information from the packet to identify a cache server in the content distribution network that maintains state information on the secure communication connection, wherein the information extracted from the packet comprises a session identifier used to compute a label identifying the cache server;

directing the packet towards the identified cache server;

wherein the label identifying the cache server is computed from the session identifier by a function f(SID) where SID is the session identifier; and wherein the function f(SID)=SID MOD n+1 where n is the number of cache servers that can store the state information on the secure communication connection.

2. The invention of claim 1 wherein the secure communication connection is a Secure Sockets Layer connection.

3. A method of operating a cache server in a content distribution network comprising the steps of:

selecting a session identifier that may be utilized by a content distribution network switch to direct packets associated with a secure communication connection to the cache server;

negotiating a secure communication connection with a client;

maintaining state information for said secure communication connection by said cache server;

wherein the session identifier is used to compute a label identifying the cache server using a function f(SID) where SID is the session identifier; and wherein the function f(SID)=SID MOD n+1 where n is the number of cache servers that can store the state information on the secure communication connection.

4. The invention of claim 3 wherein the secure communication connection is a Secure Sockets Layer connection.

* * * * *